Nov. 22, 1966     I. E. COX ET AL     3,287,173
BATTERY CLOSURE
Filed July 30, 1964
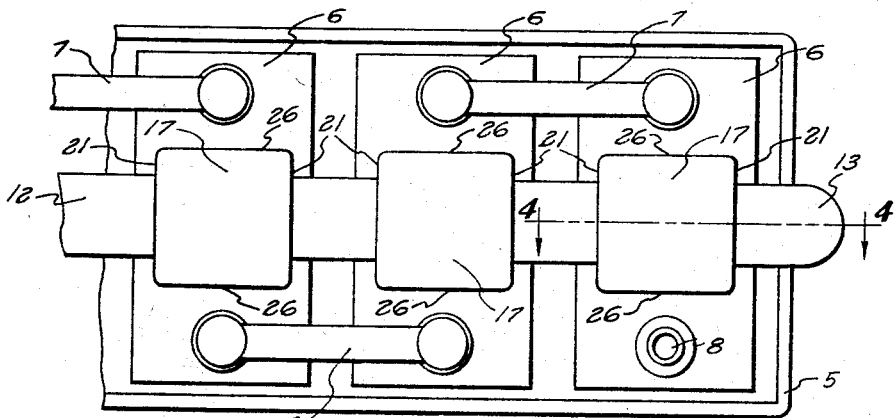
INVENTORS
IVAN E. COX
RUSSELL W. FRITTS
BY
Alfred R. Fuchs
ATTORNEY

United States Patent Office 3,287,173
Patented Nov. 22, 1966

3,287,173
BATTERY CLOSURE
Ivan E. Cox, 4740 Broadway, and Russell W. Fritts, 2320 Gillham Road, both of Kansas City, Mo.
Filed July 30, 1964, Ser. No. 386,359
2 Claims. (Cl. 136—177)

Our invention relates to battery closures and more particularly to a multiple closure for the fill openings of storage batteries.

It is a purpose of our invention to provide a multiple closure for the fill openings of storage batteries, that is provided with plug portions that are adapted to engage in the threaded fill openings of a storage battery, by merely pushing the plug portions into said threaded openings and to be disengaged from said threaded openings by merely pulling on the mounting for the closure members. This makes it possible to very quickly close the fill openings of a storage battery after servicing the same, and also very quickly obtain access to said fill openings to service the battery, compared with the usual process of screwing vented plugs into and out of position with respect to the fill openings.

More specifically it is a purpose of our invention to provide a closure for storage batteries that comprises a mounting member for a plurality of closure members consisting of a flexible rubber band of uniform width and thickness, and flexible rubber closure members mounted on said band, which closure members have a body portion with a slot therethrough for receiving the band and which closure members are each provided with a plug portion, each of which is adapted to enter one of the fill openings in the battery, which plug portion is made of a flexible rubber soft enough that it can be distorted sufficiently for the plug portion to engage the threads provided in the threaded openings to secure the closure member with its plug portions in close engagement with the opening in the battery.

It is a further purpose of our invention to provide the plug portion of such a closure member with a rib extending around the same, which is adapted to engage with one of the threads of said threaded openings to secure the plug portion in the opening, upon forcing the plug portion into an opening by pushing on the closure member in a downward direction, the rubber of the plug portion and the rib thereon being sufficiently distortable and compressible to permit of the rib entering such a thread.

It is an important purpose of our invention to provide a multiple closure member of the above referred to character for storage batteries, which is adjustable to the varied spacings that may exist between the fill openings of different manufactures of storage batteries, by providing for adjustment of the flexible rubber closure members with respect to the flexible rubber band mounting member, by providing a band of uniform width and thickness, which is rectangular in cross section over the major portion of its length and provide slots in the body portions of the flexible closure members that are also rectangular in cross section and have a portion that closely fits the band, to frictionally grip the band to hold the individual closure members in position with respect to the band, but permitting movement of the same along the band when sufficient force is applied thereto, to overcome the frictional engagement of the walls of the slot with the band.

Preferably the slots in the body portion have entrances that are wider than the width of the slots midway between said entrance portions, said slots tapering from the entrance ends thereof toward a portion that closely fits the band to frictionally grip the same, the gripping portion being preferably of substantially the width of the band.

It is another purpose of our invention to provide a vent passage in each of the closure members, which opens through the inner end of each of the closure members and which extends out through one side of the body portion of the closure member between the slot therein and the plug portion, so as to be open to the atmosphere.

Other objects and advantages of our invention will appear as the description of the drawings proceeds. We desire to have it understood, however, that we do not intend to limit our invention to the particular details shown or described except as defined in the claims.

In the drawings:

FIG. 1 is a fragmentary top plan view of a storage battery showing our invention applied thereto.

FIG. 2 is a vertical sectional view through our improved battery closure member detached from the battery, on an enlarged scale.

FIG. 3 is a section taken on the line 3—3 of FIG. 2, and

FIG. 4 is a section taken on the line 4—4 of FIG. 1, on an enlarged scale.

Referring in detail to the drawings, in FIG. 1 is shown a storage battery 5, which is provided with a plurality of cells 6, each of which has a terminal with which a suitable connector 7 is engaged to connect the cells 6 in series, and each of said batteries is provided with end terminals 8 for connecting conductors thereto, only one end of the battery being shown in FIG. 1. The battery shown in FIG. 1 is provided with a fill opening in a tubular portion 9 extending upwardly and downwardly from the top wall 10 of each cell. Said tubular portion is provided with an internally threaded opening 11, thus providing a threaded fill opening for each of the cells 6.

Our improved closure member comprises a flexible rubber band 12, which is longer than the length of the battery, and which is of considerably greater width than thickness, having a curved end portion 13 at each end thereof extending beyond the last cell of the battery. The band 12 is made of a rubber of such flexibility that the end 13 will tend to bend down as shown in FIG. 4. The rubber of the band 12, while distortable and flexible, has sufficient stiffness to maintain the portions thereof extending between the cells of the battery in a substantially horizontal position without sagging. Said band is rectangular in cross section, having flat top and bottom faces 14 and 15 and straight side walls 16 that extend perpendicularly to the top and bottom faces 14 and 15. The band 12 may be made of either natural or artificial rubber.

Mounted on the band 12 are the closure members 17, which have plug portions 18 depending therefrom, that are adapted to be forced into one of the internally threaded fill openings of the battery provided with the threads 11, said body portion being made of a rubber of such a character that it is readily compressible and distortable so that it can be forced into the internally threaded fill opening of the battery cell, said plug portion 18 preferably tapering slightly to decrease in cross section in an upward direction as viewed in FIGS. 2 and 4 and being provided with a circumferential rib 19 that is preferably V-shaped in cross section, and which is adapted to snap into one of the threads 11, when the plug portion is forced into the internally threaded fill openings, by pushing downwardly on the closure member having said plug portion. The rubber of which the plug portion 18 is made is of such a character that the rib 19 will distort sufficiently to permit snapping of the same into one of the threads and can also be distorted sufficiently to be released from the threads by an upward pull on the body portion of the closure member, the band 12 serving as means for pulling upwardly on each of said plug portions along the length thereof to disengage the battery closure from the battery.

The upper body portion of the closure 17 is provided with a transverse slot 20, which extends through the same from one side edge 21 to the opposite side edge 21 of the upper body portion, the upper body portion of the closure member 17 being shown as being square, although it may have other shapes should this be found desirable, as long as it has a slot through the same extending transversely through the same, extending from one side thereof to the opposite side thereof, for receiving the flexible mounting band 12. The slot 20 is preferably provided with flat parallel top and bottom walls 22 and with side walls that diverge from a point substantially midway between the side walls 21, indicated by the numeral 23, to their entrances at the side walls 21, the points 23 of closest approach of said side walls of the slot to each other being spaced from each other so as to be frictionally engaged by the side edges 16 of the band 12, the side walls being preferably provided with gradually outwardly curving portions 24 extending from the points 23 of closest approach to each other of said side walls to the entrances thereof at the sides 21 of the body portion of the closure member 17.

The body portion of the closure member 17 has a flat top face 25 and flat side walls 26 extending perpendicularly to the side walls 21. Said body portion is also provided with a flat bottom wall portion 28 surrounding the plug portion 18 at its junction with said body portion and a bevelled portion 29. Each of said closure members is provided with venting means comprising a passage 30 having an enlarged bottom end portion 31 and connected with a transverse passage 32 in the body portion 17 leading through one of the sides 26 of the body portion to the atmosphere.

To apply the closure to a battery the closure members 17 are adjusted along the band 12 so that there will be a plug portion 18 of one of said closure members 17 in alignment with each of the threaded openings 11 of the battery. The plug portions 18 are then successively pushed into the threaded openings by pressing downwardly on the flat top walls 25 of the closure members, until the flat face 28 of each closure member engages with the top edge 33 of the tubular portion 9. This provides a seal between the battery and the closure member 17. As the plug portion 18 is forced downwardly the rib 19 will engage the threads 11 and will be seated in one of said threads when the flat face 28 engages top edge 33 to hold said plug 18 in the threaded opening and said flat face 28 in engagement with the top edge of the tubular portion 9.

To remove the closure from the battery it is only necessary to pull sharply upwardly on one of the ends 13 of the band to remove the closure member 17, adjacent said end, from the threaded opening in the battery and proceed in the same manner with the succeeding closure members by continuing the upward pull on the band 12. The action could be described as peeling the closure from the battery.

The removal of the closure ordinarily will not disturb the spacing of the closure members 17 on the band as the frictional grip of the walls of the slot at the narrow portion thereof will hold the closure members 17 in position on the band 12 during removal from the battery.

What we claim is:

1. In a closure for storage batteries a flexible rubber band and flexible closure members mounted on said band, said closure members each having a body portion provided with a transverse slot therethrough, through which said band extends, said slots being rectangular in cross section and having flat parallel top and bottom walls and convexly curving side walls to provide slots that are of uniform height and gradually decreasing width from each end thereof to a mid-portion of minimum width, said closure members having depending plug portions having peripheral flexible ribs thereon spaced from the lower ends thereof, said closure members each having a vent passage therethrough.

2. The combination with the battery having threaded openings therein, of a closure for said openings comprising a flexible rubber band and flexible closure members mounted on said band, said closure members having plug portions having peripheral flexible ribs thereon spaced from the lower ends thereof, and vent passages therethrough, said plug portions fitting in said threaded openings and said ribs being distortable to engage said flexible ribs each with the thread of one of said threaded openings by pushing said plug into said opening and to disengage said ribs from said threads by upward pull on said flexible band, said closure members having upper rectangular body portions from which said plug portions extend, each of said upper body portions having a transverse slot extending therethrough, said slots being rectangular in cross section and having flat parallel top and bottom walls and convexly curved side walls to provide slots that are of uniform height and gradually decrease in width from each end thereof to a mid-portion of minimum width, engaging the side edges of said band.

References Cited by the Examiner

UNITED STATES PATENTS 2,570,123 10/1951 Heine _____ 136—177
2,881,239 4/1959 Fingerhut _____ 136—177

FOREIGN PATENTS 241,006 1/1960 Australia.
361,832 11/1931 Great Britain.
799,552 8/1958 Great Britain.

WINSTON A. DOUGLAS, *Primary Examiner.*

D. L. WALTON, *Assistant Examiner.*